United States Patent
Moberg et al.

(10) Patent No.: US 6,821,319 B1
(45) Date of Patent: Nov. 23, 2004

(54) METHOD AND AN APPARATUS FOR CLEANING OF GAS

(75) Inventors: Hans Moberg, Stockholm (SE);
Torgny Lagerstedt, Stockholm (SE);
Claes Inge, Saltsjö-Duvnäs (SE);
Claes-Göran Carlsson, Tullinge (SE);
Stefan Szepessy, Stockholm (SE);
Peter Franzén, Tullinge (SE); Leonard Borgström, Tyresö (SE)

(73) Assignee: Alfa Laval AB, Tumba (SE)

( * ) Notice: Subject to any disclaimer, the term of this patent is extended or adjusted under 35 U.S.C. 154(b) by 0 days.

(21) Appl. No.: 10/129,667

(22) PCT Filed: Oct. 27, 2000

(86) PCT No.: PCT/SE00/02120

§ 371 (c)(1),
(2), (4) Date: Sep. 17, 2002

(87) PCT Pub. No.: WO01/36103

PCT Pub. Date: May 25, 2001

(30) Foreign Application Priority Data

Nov. 15, 1999 (SE) .............................................. 9904116

(51) Int. Cl.[7] .............................................. B01D 45/14
(52) U.S. Cl. .................. 95/270; 55/385.3; 55/403; 55/406; 55/407; 55/DIG. 19; 60/311
(58) Field of Search ................. 55/400–407, 385.3, 55/DIG. 19; 95/270, 269, 218, 260; 96/359; 60/311; 494/70

(56) References Cited

U.S. PATENT DOCUMENTS

| | | | | |
|---|---|---|---|---|
| 2,104,683 A | | 1/1938 | Van Rosen et al. ............ 55/403 |
| 3,094,828 A | * | 6/1963 | Payne et al. .................... 55/407 |
| 3,234,716 A | | 2/1966 | Sevin e al. ................ 55/407 X |
| 3,944,406 A | * | 3/1976 | Jagusch et al. ................ 55/407 |
| 5,735,789 A | * | 4/1998 | Borgstrom et al. ............ 494/70 |
| 5,779,619 A | * | 7/1998 | Borgstrom et al. ............ 494/56 |
| 5,788,622 A | * | 8/1998 | Borgstrom et al. ............ 494/57 |
| 6,080,098 A | * | 6/2000 | Borgstrom et al. ............ 494/27 |
| 6,183,407 B1 | * | 2/2001 | Hallgren et al. ............... 494/49 |
| 6,200,252 B1 | * | 3/2001 | Hallgren et al. ............... 494/49 |
| 6,533,713 B1 | * | 3/2003 | Borgstrom et al. ............ 494/66 |
| 6,536,211 B1 | * | 3/2003 | Borgstrom et al. ............ 60/311 |

FOREIGN PATENT DOCUMENTS

| | | |
|---|---|---|
| DE | 916 689 | 7/1954 |
| DE | 35 41 204 A1 | 5/1987 |
| DE | 43 11 906 A1 | 10/1994 |
| WO | WO 90/05028 | 5/1990 |
| WO | WO 99/56883 | 11/1999 |

* cited by examiner

*Primary Examiner*—Richard L. Chiesa
(74) *Attorney, Agent, or Firm*—McCormick, Paulding & Huber LLP

(57) ABSTRACT

In connection with cleaning of gas from particles suspended therein and being heavier than the gas the gas is caused to rotate in a chamber delimited in a stationary housing, so that the particles by centrifugal force are separated from the gas and are thrown towards a stationary housing. The rotation of the gas is accomplished by means of a rotor, which includes a stack of conical separation discs arranged coaxially with each other and concentrically with the rotational axis of the rotor. The gas to be cleaned is caused to flow through interspaces between the separation discs, while they are rotating, the particles by the centrifugal force being brought into contact with the insides of the separation discs. In contact with the insides of the separation discs the particles first move along the generatrices of the separation discs and then move along inclined guiding members, which are arranged in contact with said insides. The guiding members collect particles moving across different sectors of the separation discs and conduct them to separate areas distributed around the surrounding edges of the separation discs. From these areas the particles in an agglomerated or coalesced form are thrown away from the separation discs towards the stationary housing.

24 Claims, 1 Drawing Sheet

METHOD AND AN APPARATUS FOR CLEANING OF GAS

CROSS-REFERENCE TO RELATED APPLICATIONS

Figure 1:
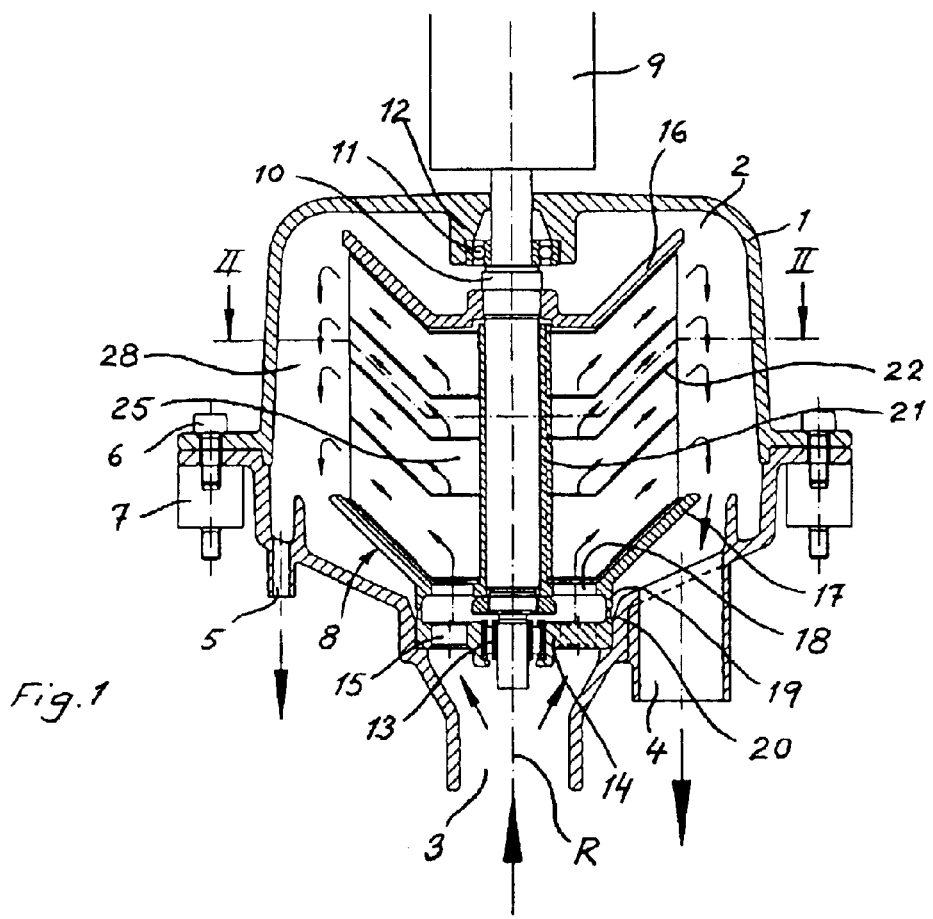

This application is entitled to the benefit of and incorporates by reference essential subject matter disclosed in International Application No. PCT/SE00/02120 filed on Oct. 27, 2000 and Swedish Patent Application No. 9904116-2 filed on Nov. 15, 1999.

The present invention relates to a method and an apparatus for cleaning of gas, by means of centrifugal force, from solid or liquid particles suspended in the gas and having a larger density than the gas. The invention is intended for use above all in connection with cleaning of so called crankcase gases, i.e. gases formed in a combustion engine, from particles in the form of oil and/or soot. Alternatively, however, it may be used in other connections.

More closely the invention concerns cleaning of gas in a way such that the gas is conducted through a chamber, which is delimited by a stationary housing, and is caused to rotate in the chamber by means of a rotor kept in rotation around a rotational axis, the particles by upcoming centrifugal force being separated from the gas and thrown towards the stationary housing.

An apparatus for cleaning of gas in this way is known for instance through each one of the patents DE 35 41 204 A1 and DE 43 11 906 A1, which describe cleaning of crankcase gases coming from a combustion engine.

Thus, DE 35 41 204 A1 shows an apparatus of this kind, in which the rotor is formed as a turbine or pump wheel, which is adapted to be brought into rotation by gas to be cleaned entering from below into said chamber. The gas to be cleaned is caused to flow through the turbine or pump wheel from its centre to its periphery, where it leaves the turbine or pump wheel, rotating at the same speed as this wheel. Particles are separated from the gas rotating in the chamber by centrifugal force, and cleaned gas leaves the chamber through an outlet at the upper part thereof. Particles separated from the gas deposit onto the surrounding wall of the chamber, liquid particles coalescing on the surrounding wall and liquid, thereafter, running down it and further out through an outlet situated at the bottom of the chamber.

DE 43 11 906 A1 shows a similar apparatus for cleaning of crankcase gases, in which the rotor is adapted to be driven by means of pressurized lubricating oil coming from the combustion engine, the crankcase gases of which are to be cleaned in the apparatus. The driving lubricating oil is supplied to the rotor at its centre and leaves the rotor through tangentially directed outlets situated at a distance from the rotational axis of the rotor. The rotor constitutes in itself, in this case, a device for cleaning of the driving lubricating oil. The cleaned lubricating oil is released in the lower part of the chamber, through which the crankcase gases shall pass in order to be cleaned, and is returned therefrom to the lubricating oil system of the combustion engine. The crankcase gases are caused to pass axially through a narrow space delimited in the chamber between the rotor and the surrounding stationary housing. Gas rotating in the space is freed from particles suspended therein, which particles deposit onto the inside of the stationary housing, where liquid particles coalesce and liquid thus formed, thereafter, flows towards an outlet.

The two above described known apparatuses for cleaning of crankcase gases have rather a poor efficiency when it comes to separation of particles from a through flowing gas.

The object of the present invention primarily is to accomplish a method of cleaning gases, particularly crankcase gases, which is substantially more effective than the above described gas cleaning methods. It is suggested that a certain previously known technique, other than the one mentioned above for cleaning of crankcase gases, is utilised and improved.

Thus, it is suggested, in accordance with what has initially been said, that a rotor is kept rotating around a rotatonal axis in a chamber delimited by a stationary surrounding wall, which rotor comprises a stack of conical separation discs arranged coaxially with each other and concentrically with said rotational axis, the separation discs being provided with radially outer surrounding edges, the gas to be cleaned is conducted through interspaces formed between the separation discs from gas inlets to gas outlets situated at differently large distances from the rotational axis of the rotor, so that the gas is caused to rotate with the rotor and the particles, as a consequence of upcoming centrifugal force, are brought into contact with the insides of the separation discs, and separated particles by the rotation of the rotor are caused first to move a distance in contact with the separation discs substantially along the generatrices thereof towards said surrounding edge and then are thrown from the separation discs towards said surrounding wall.

Technology of this kind is previously known for instance through U.S. Pat. No. 2,104,683 and U.S. Pat. No. 3,234,716. In each one of these patent specifications it is described how particles having been brought into contact with the insides of the conical separation discs are moved by means of centrifugal force towards the surrounding edges of the separation discs.

U.S. Pat. No. 2,104,683 describes (with reference to FIG. 2) that particles in the areas of the radially outermost parts of the separation discs are influenced substantially only by centrifugal forces and move substantially along the generatrices of the separation discs, i.e. in straight paths along radii drawn from the rotational axis of the rotor, whereas particles in the areas of the radially inner parts of the separation discs also and to a very large degree are influenced by flowing gas and, thereby, move in a direction forming an angle with these generatrices. The flowing gas may move substantially freely between the separation discs and may adopt a flow direction determined by among other things the speed by which the gas enters the interspaces between the separation discs and the degree of influence from the rotating separation discs.

U.S. Pat. No. 3,234,716 describes (with reference to the FIGS. 3 and 4) how particles are separated in the interspaces between conical separation discs. After having got into contact with the insides of the separation discs the separated particles move substantially radially outwardly from the rotational axis of the rotor towards the surrounding edges of the separation discs.

For improvement of the separation efficiency upon use of this previously known technique it is suggested according to the invention that separated particles moving in contact with the separation discs substantially along the generatrices thereof are caught and conducted, together with other particles caught in a similar way, further towards the said surrounding edges of the separation discs along paths forming an angle with said generatrices and that separated particles are caused to leave said paths and are thrown from the separation discs substantially only in limited areas spaces from each other along the surrounding edges of the respective separation discs.

The improvement hereby obtainable is that particles which have once been separated from the gas have increased possibilities in comparison with use of the previously known technology to remain separated from the gas and, thus, not to be entrained again by gas flowing at a large velocity through the space through which the particles have to pass on their way from the rotor to the surrounding stationary surrounding wall. Thus, the particles are collected by means of guiding or conducting members, after which they are conducted further on by means of the centrifugal force towards the surrounding edges of the separation discs while being agglomerated or coalesced to larger particles. In an agglomerated form or as relatively large drops the separated particles are then thrown towards the stationary surrounding wall in limited areas distributed along the surrounding edges of the separation discs, whereas between such areas spaces are left for gas flow into or out of the interspaces between the separation discs.

The gas to be cleaned may be brought to flow between the separation discs either in a direction from or in a direction towards the rotational axis of the rotor. It is preferred that the flow is taking place in the direction from the rotational axis, as the flow will then be assisted by a pumping effect of the rotor on the gas. Thereby, no auxiliary means are needed to get the gas to flow through the interspaces between the rotating separation discs. The gas to be cleaned preferably is conducted into the interspaces through an inlet space delimited centrally in the stack of separation discs, whereas cleaned gas is conducted out of the interspaces to an outlet space in said chamber, which surrounds the stack of separation discs.

The invention also concerns an apparatus for cleaning of gas from particles suspended therein. An apparatus of this kind comprises a stationary housing that delimits a chamber and that has a gas inlet to the chamber and a gas outlet from the chamber, and a rotor rotatable around a rotational axis and adapted to bring gas to be cleaned into rotation in the chamber. The apparatus according to the invention is characterised in that the rotor includes a stack of conical separation discs arranged coaxially with each other and concentrically with the rotational axis of the rotor, said separation discs delimiting between themselves interspaces for through flow of gas, that at least a first flow space is delimited centrally in the stack of separation discs, which flow space communicates with radially inner parts of the interspaces between the separation discs, that at least a second flow space is delimited by and between the stack of separation discs and the stationary housing, said second flow space communicating with radially outer parts of the interspaces between the separation discs, that said first flow space communicates with one and said other flow space communicates with the other one of the gas inlet and the gas outlet, respectively, the apparatus being formed to conduct substantially all gas, which is supplied through the gas inlet to said chamber, through the interspaces between the separation discs, and that each one of the conical separation discs on its inside is in contact with or is connected with elongated conducting members, each of which extends in an angle with the generatrices of the separation disc from a point at a first distance from the rotational axis of the rotor to a point at a second larger distance from the rotational axis of the rotor, said conducting members for each separation disc ending in the vicinity of the surrounding edge of the separation disc spaced from each other seen along the surrounding edge.

The separation discs may have the form of either complete or frustroms of cones, each separation disc having either one large or several small holes in its central portion for through flow of gas to be cleaned or gas having been cleaned. Such holes in the separation discs form together with the interspaces between the separation discs central parts of one or more inlet or outlet spaces centrally in the stack of separation discs. For reasons having been given before it is preferred that the flow space centrally in the stack of separation discs communicates with the inlet and that the flow space surrounding the separation discs communicates with the gas outlet, so that gas to be cleaned is caused to flow in a direction from the rotational axis of the rotor through the interspaces between the separation discs.

In operation of an apparatus according to the invention liquid particles depositing on the surfaces of the separation discs will coalesce to larger drops, which when they reach said conducting members and move along these will coalesce to even larger drops. The liquid drops leaving the separation discs are, therefore, substantially larger than the liquid particles contained in the not yet cleaned gas. Even solid particles depositing on the surfaces of the separation discs will accumulate or be agglomerated to substantially larger units, before they are thrown away from the surrounding edges of the separation discs.

Since particles having got into contact with a separation disc will then move substantially along the generatrices thereof, it is suitable that conducting members of the aforementioned kind are distributed around the rotational axis of the rotor and have an extension such that two adjacent conducting members cross one and the same generatrix of the separation disc at points situated at different distances from the rotational axis of the rotor. Hereby, it can be assured that substantially all particles having got into contact with the separation disc are caught by the conducting members and may agglomerate or coalesce with other particles to larger units on or at these conducting members on their way towards the surrounding edge of the separation disc.

The conducting members advantageously are formed such that they can also serve as spacing members between adjacent separation discs. Then, each conducting member along the whole or parts of its extension may bridge the whole distance between two adjacent separation discs. More or less the conducting members will then also determine the flow direction of the gas flowing between the separation discs. Nothing prevents, however, that all or some of the conducting members extend only across part of the axial distance between adjacent separation discs. Preferably, a conducting member is firmly connected with a separation disc.

The stationary housing surrounding the rotor preferably has an outlet at the lower part of the chamber for liquid or sludge having been separated from the contaminated gas and having deposited on the surrounding wall of the chamber.

In an apparatus according to the invention the rotor may be driven by means of any suitable kind of driving device, e.g. an electrically, hydraulically or pneumatically driven motor.

Figure 2:
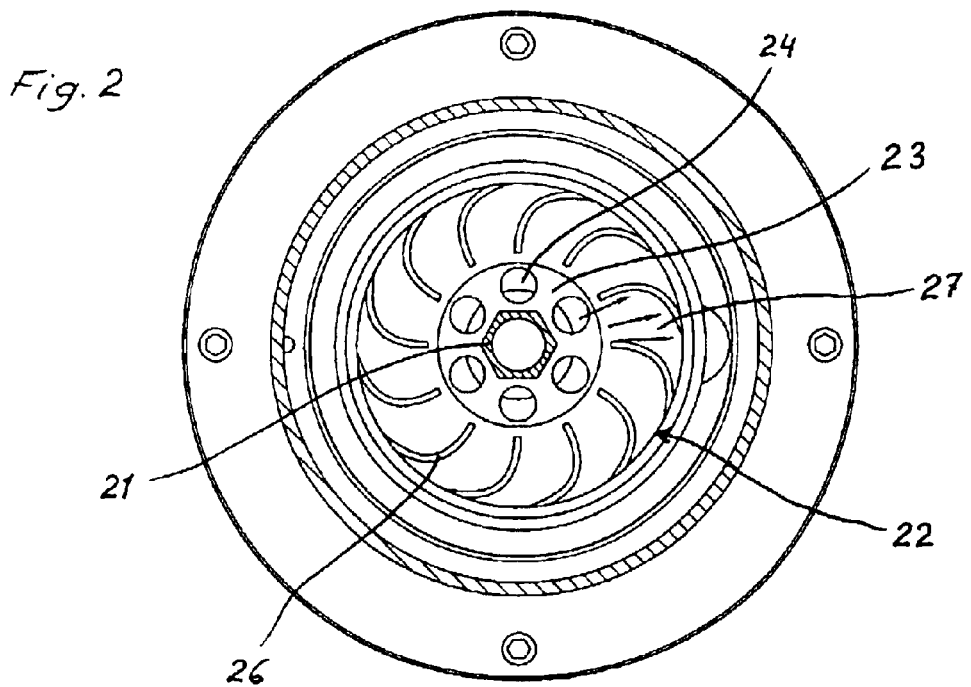

The invention is further described in the following with reference to the accompanying drawing, which shows in FIG. 1 a longitudinal section through an apparatus formed according to the invention and in FIG. 2 shows a section along the line II—II in FIG. 1.

In the drawing FIG. 1 shows a sectional view of an apparatus formed according to the invention and intended for cleaning of a gas from particles suspended therein and having a larger density than the gas. The apparatus includes a stationary housing 1 delimiting a chamber 2. The housing forms a gas inlet 3 to the chamber 2 for gas to be cleaned and a gas outlet 4 from the chamber 2 for cleaned gas. The housing further forms a particle outlet 5 from the chamber 2 for particles having been separated from the gas.

The housing 1 includes two parts, which are kept together by means of a number of screws 6. These screws 6 also are adapted to keep the housing fastened to suspension members 7 of an elastic material of some kind, through which the housing may be supported on a support (not shown).

Within the chamber 2 there is arranged a rotor 8 rotatable around a vertical rotational axis R. A motor 9, e.g. an electric motor, is arranged for rotation of the rotor 8. The rotor 8 includes a vertically extending central spindle 10, which at its upper end is journalled in the housing 1 through a bearing 11 and a bearing holder 12 and at its lower end is journalled in the housing 1 through a bearing 13 and a bearing holder 14. The bearing holder 14 is situated in the gas inlet 3 of the housing and, therefore, is provided with through holes 15 for incoming gas to be cleaned in the chamber 2.

The rotor 8 further includes an upper end wall 16 and a lower end wall 17, which two end walls are connected with the central spindle 10. The lower end wall 17 in a central portion is provided with through holes 18, so that the interior of the rotor may communicate with the gas inlet 3. Furthermore, the lower end wall 17 is provided with an annular flange 19, which is adapted to co-operate with a similar annular flange 20 of the bearing holder 14, so that gas entering through the gas inlet 3 is conducted into the interior of the rotor 8 through the aforementioned holes 18. The flanges 19 and 20 may be adapted to completely seal against each other, but a complete sealing between them is not necessary. The reason for this shall be explained later.

The lower end wall 17 is formed in one piece with a hollow column 21 extending axially upwardly from the end wall 17 and sealingly surrounding the central spindle 10. The column extends all the way up to the upper end wall 16. In the area of the column 21 the central spindle 10 is cylindrical, preferably for cost reasons circular cylindrical, and the inside of the column 21 is formed in the same way as the outside of the spindle. The outside of the column 21 has a non-circular cross sectional form, as can be seen from FIG. 2.

A stack of conical separation discs 22 is arranged between the end walls 16 and 17. Each one of the separation discs has a frustoconical portion and in one piece therewith a plane portion 23 closest to the column 21. The plane portion, as can be seen in FIG. 2, is formed so that it may engage the non-circular column 21 such that the separation disc shall not be able to rotate relative to the column 21. Furthermore, the plane portion 23 is provided with several through holes 24. Irrespective of whether the holes in the various separation discs 22 are aligned axially with each other or not they form together with the interspaces between the central portions of the separation discs 22 a central inlet space 25 within the rotor 8 (see FIG. 1), which communicates with the gas inlet 3.

For the sake of clarity the drawing shows only a few separation discs 22 having large axial interspaces. In practice several more separation discs should be arranged between the end walls 16 and 17, so that relatively thin interspaces are formed between the discs.

FIG. 2 shows the side of a separation disc 22 facing upwardly in FIG. 1. In the following this side is called the inside of the separation disc, since it faces in a direction inwardly towards the rotational axis of the rotor. As can be seen the separation disc on its inside is provided with several elongated ribs 26 forming spacing members between the separation disc and the adjacent separation disc situated above it in the disc stack. Between the adjacent ribs 26 in an interspace between two separation discs flow passages 27 are formed for gas to be cleaned. The ribs 26 extend, as shown in FIG. 2, along curved paths and form at least at the radially outer surrounding portions of the separation discs an angle with the generatrices of the separation discs. As a consequence of the curved form of the ribs 26 also the flow passages 27 for gas to be cleaned extend along paths which are curved in a corresponding way. The ribs 26 extend preferably across substantially the whole of the conical portion of every separation disc and end up in the vicinity of the radially outer surrounding edge of the separation disc.

An annular space 28 surrounds the rotor 8 in the housing 1 and forms a part of the chamber 2.

The apparatus described above and shown in the drawing operates in the following manner when cleaning gas from particles suspended therein and having a larger density than the gas. It is assumed in this case that the particles are of two kinds, namely partly solids, e.g. soot particles, partly liquid particles, e.g. oil particles.

By means of the motor 9 the rotor 8 is kept in rotation. Gas contaminated by particles is introduced into the housing 1 from below through the inlet 3 and is conducted further on into the central inlet space 25. From here gas flows into and radially outwardly through the interspaces between the separation discs 22.

While the gas flows between the separation discs 22 it is brought into rotation as a consequence of the rotation of the rotor. Thereby, the particles suspended in the gas are forced by the centrifugal force to move towards and into contact with the insides of the separation discs, i.e. the sides of the separation discs facing upwardly in FIG. 1. Upon contact with the separation discs the particles will be entrained thereby and, thereafter, be influenced mainly by centrifugal forces causing the particles to move radially outwardly along the generatrices of the separation discs. The movement of the particles along these generatrices is illustrated by means of arrows in FIG. 2.

Owing to the ribs 26 forming an angle with the generatrices of the separation discs the ribs will catch particles moving in contact with the separation discs towards the surrounding edges thereof. The particles caught will be conducted further along the ribs 26 which, thus, will serve as guiding members for the particles.

As to separated liquid particles, these coalesce to larger particles while moving in contact with the separation discs 22. Further such coalescense occurs when the liquid particles move further on along the ribs 26 towards the surrounding edges of the separation discs. This latter movement also occurs by influence of centrifugal force. When the liquid particles reach the surrounding edges of the separation discs the coalescense has proceeded so far that the liquid is thrown out of the rotor in the form of relatively large liquid drops. These liquid drops hit the surrounding wall of the housing 1, after which the liquid thus formed runs downwardly along this surrounding wall and out through the particle outlet 5.

Said liquid drops will leave the separation discs in limited areas situated at a distance from each other along the surrounding edges of the respective separation discs, i.e. in the areas of the radially outer ends of the ribs 26.

As to separated solids, also these move in contact with the separation discs 22 towards said ribs 26 and further in contact with these ribs towards the radially outermost edges of the separation discs. Together with the liquid drops the particles are thrown from the rotor against the surrounding wall of the housing 1, where they are entrained by down running liquid to and out through the particle outlet 5.

As can be seen from FIG. 2, the ribs 26 have a location and an extension such that two adjacent ribs on the same separation disc cross one and the same generatrix of the separation disc at different distances from the rotational axis of the rotor. In other words the ribs 26 distributed around the rotational axis partly overlap each other, if they are seen from the rotational axis. Such overlapping may be to a larger or smaller extent, so that substantially all particles being brought into contact with the underside of the separation disc can be caught by means of curved ribs of this kind and by the ribs be conducted further towards the surrounding edge of the separation disc.

The above described function of the curved ribs 26 is obtained independently of the chosen rotational direction for the rotor. The ribs need not necessarily be curved as shown in FIG. 2. The main thing is that they form an angle with the generatrices of the separation discs and that this angle is such that particles having been caught by the ribs may be guided along these ribs towards the surrounding edges of the separation discs. As to solid particles, the angle of repose of the particles has to be considered in each particular case.

The gas which in each interspace between adjacent separation discs has been freed from particles leaves the interspace through spaces situated between the aforementioned areas, at which separated particles are thrown away from the separation discs towards the stationary housing. The cleaned gas leaves the chamber 2 through the gas outlet 4. As a consequence of the rotor rotation the gas flowing through the interspaces between the separation discs 22 will get an increased pressure. Thus, a higher pressure prevails in the space 28 around the rotor 1 and in the area of the gas outlet 4 than in the central space 25 and in the gas inlet 3. This means that a possible leak between the flanges 19 and 20 does not have any substantial importance. Uncleaned gas, thus, may not flow between the flanges 19 and 20 directly from the gas inlet 3 to the gas outlet 4 but, instead, some cleaned gas will flow back into the central space 25.

Thanks to the above described concentration or agglomeration of particles on the surfaces of the separation discs, particularly close to the spacing members 26, solid or liquid material having been separated from the gas will leave the separation discs in particle aggregates or drops so large that these will not to a substantial degree be entrained out of the housing 1 by the gas flowing through the space 28.

The described and shown apparatus has a large separation efficiency and may be produced very cheaply upon a suitable choice of material for the different parts of the apparatus. Thus, most of the apparatus parts may be made of plastics. Apart from screws and bearings only the central spindle 10 should preferably be made of metal.

As already mentioned the lower end wall 17 of the rotor and the column 21 may be made in one piece, suitably out of plastics. A part of the rotor formed in this way may form a basis for an automatized mounting of the separation discs 22, which also suitably are made of plastics. The whole rotor mounted in this way, with or without a spindle 10, may form an inexpensive unit for the finished apparatus, which is easily exchangeable.

What is claimed is:

1. A method of cleaning a gas from solid or liquid particles suspended therein and having a larger density than the gas, wherein a rotor is kept rotating around a rotational axis in a chamber, that is delimited by a stationary surrounding wall, said rotor comprising a stack of conical separation discs arranged coaxially with each other and concentrically with said rotational axis and being provided with radially outer surrounding edges, the gas to be cleaned is conducted through interspaces formed between the separation discs from gas inlets to gas outlets situated at different distances from the rotational axis of the rotor, so that the gas is caused to rotate with the rotor and the particles, thereby, as a consequence of upcoming centrifugal force are brought into contact with the insides of the separation discs, and separated particles by the rotation of the rotor are first brought to move a distance in contact with the separation discs substantially along generatrices thereof towards said surrounding edges and after that are caught and conducted, together with other particles caught in a similar way, further towards said surrounding edges of the separation discs along paths forming an angle with said generatrices, wherein that separated particles are caused to leave said paths and be thrown from the separation discs directly out into said chamber delimited by the stationary surrounding wall substantially only in limited areas situated at a distance from each other along the surrounding edges of the respective separation discs.

2. A method according to claim 1, in which the gas to be cleaned is conducted between the separation discs in a direction from the rotational axis towards said surrounding edges of the separation discs.

3. A method according to claim 2, in which the gas to be cleaned is conducted into a central inlet space in the stack of separation discs and from there through the interspaces between the separation discs, after which cleaned gas is conducted out of the chamber through a gas outlet communicating with an outlet space that is formed by and between the stack of separation discs and the stationary surrounding wall.

4. A method according to claim 1, in which the gas to be cleaned is entrained in the rotor rotation, while passing through the interspaces between the separation discs, by means of members bridging the interspaces between adjacent separation discs.

5. A method according to claim 1, in which the gas is conducted between the separation discs along flow paths substantially in parallel with said paths for the separated particles.

6. A method of cleaning crankcase gases from a combustion engine in accordance with claim 1.

7. An apparatus for cleaning of gas from solid or liquid particles suspended therein and having a larger density than the gas, which apparatus includes a stationary housing, which delimits a chamber, and a rotor, which is rotatable in the chamber around a rotational axis and is adapted to bring gas to be cleaned in rotation, the apparatus further having a gas inlet for gas to be cleaned, a gas outlet for cleaned gas and a particle outlet for particles separated from the gas, wherein the rotor includes a stack of conical separation discs arranged coaxially with each other and concentrically with the rotational axis of the rotor, said separation discs delimiting between themselves interspaces for through flow of gas, at least a first flow space is delimited centrally in the stack of separation discs and communicates with radially inner parts of the interspaces between the separation discs, at least one second flow space surrounds the stack of separation discs and communicates with radially outer parts of the interspaces between the separation discs, said first flow space communicates with one and said second flow space communicates with the other one of said gas inlet and gas outlet, respectively, the apparatus further being formed to conduct substantially all gas which is supplied through the gas inlet through the interspaces between the separation discs, each one of the conical separation discs on its inside has contact with or is connected with elongated guiding members, each of which extends in an angle with the generatrices of the separation disc from a point at a first distance from the rotational axis of the rotor to a point at a second larger distance from the rotational axis of the rotor, said guiding members for each separation disc ending in the vicinity of the surrounding edge of the separation disc spaced from each other seen along the surrounding edge, and said at least second flow space is delimited centrally in the stack of separation discs.

8. An apparatus according to claim 7, in which said guiding members are distributed around the rotational axis of the rotor and has an extension such that two adjacent guiding members cross one and the same generatrix of the separation disc in question at points having different distances from the rotational axis of the rotor.

9. An apparatus according to claim 7, in which the guiding members bridge the spaces between adjacent separation discs.

10. An apparatus according to claim 7, in which said first flow space communicates with the gas inlet and said other flow space communicates with the gas outlet.

11. A method of cleaning crankcase gas, coming from a combustion engine, from solid or liquid particles suspended therein and having a larger density than the crankcase gas, wherein a rotor is kept rotating around a rotational axis in a chamber, that is delimited by a stationary surrounding wall, said rotor comprising a stack of conical separation discs arranged coaxially with each other and concentrically with said rotation axis and being provided with radially outer surrounding edges, the crankcase gas to be cleaned is conducted through interspaces formed between the separation discs from gas inlets to gas outlets situated at different distances from the rotational axis of the rotor, so that the crankcase gas is caused to rotate with the rotor and the particles, thereby, as a consequence of upcoming centrifugal force are brought into contact with the insides of the separation discs, and separated particles by the rotation of the rotor are first brought to move a distance in contact with the separation discs substantially along generatrices thereof towards said surrounding edges and after that are thrown from the separation discs directly out into said chamber delimited by said stationary surrounding wall.

12. A method according to claim 11, in which the crankcase gas to be cleaned is conducted between the separation discs in a direction from the rotational axis towards said surrounding edges of the separation discs.

13. A method according to claim 12, in which the crankcase gas to be cleaned is conducted into a central inlet space in the stack of separation discs and from there through the interspaces between the separation discs, after which cleaned crankcase gas is conducted out of the chamber through a gas outlet communicating with an outlet space that is formed by and between the stack of separation discs and the stationary surrounding wall.

14. A method according to claim 11, in which the crankcase gas to be cleaned is entrained in the rotor rotation, while passing through the interspaces between the separation discs, by means of members bridging the interspaces between adjacent separation discs.

15. A method according to claim 11, wherein the separated particles moving in contact with the separation discs substantially along the generatrices thereof are caught and conducted, together with other particles caught in a similar way, further towards said surrounding edges of the separation discs along paths forming an angle with said generatrices, and that separated particles are caused to leave said paths and be thrown from the separation discs substantially only in limited areas situated at a distance from each other along the surrounding edges of the respective separation discs.

16. A method according to claim 15 in which the crankcase gas is conducted between the separation discs along flow paths substantially in parallel with said paths for the separated particles.

17. A crankcase gas cleaning device for an internal combustion engine, comprising a centrifugal separator for separating oil from crankcase gas, the separator being provided with a gas inlet for a gas-oil mixture, a gas outlet for clean gas and an oil outlet for separated oil, said separator further being designed as a disc separator having a stator in the form of a housing, in which a rotor comprising a stack of conical separation discs is arranged, the rotor being rotatable about a rotor axis, along and around which said discs are coaxially arranged, and having gaps formed between adjacent discs and connecting a space within the rotor with a space surrounding the rotor inside said housing, wherein said space within the rotor communicates with a first connection and said space surrounding the rotor communicates with a second and a third connection, said third connection serving as said oil outlet, and wherein one of said first connection and said second connection serves as said gas outlet.

18. A crankcase gas cleaning device according to claim 17, wherein said first connection serves as said gas inlet and said second connection serves as said gas outlet.

19. A crankcase gas cleaning device according to claim 17, wherein said second connection serves as said gas inlet and said first connection serves as said gas outlet.

20. Use of a device according to claim 17 for cleaning of crankcase gas from oil, wherein oil separated from the crankcase gas and being in contact with said separation discs is thrown away from the separation discs out into said space surrounding the rotor.

21. A crankcase gas cleaning apparatus for cleaning of crankcase gas from solid or liquid particles suspended therein and having a larger density than the gas, which apparatus comprises a stationary housing, which delimits a chamber, and a rotor rotatable in said chamber about a rotational axis and arranged to bring gas to be cleaned in rotation, the apparatus further having a gas inlet for said gas to be cleaned, a gas outlet for cleaned gas and a particle outlet for said particles having been separated from the gas, wherein the rotor includes a stack of conical separation discs arranged coaxially with each other and concentrically with the rotational axis of the rotor, said separation discs delimiting between themselves interspaces for through flow of gas, at least a first flow space is delimited centrally in the stack of separation discs and communicates with radially inner parts of the interspaces between the separation discs, at least a second flow space is delimited by and between the stack of separation discs and the stationary housing and communicates with radially outer parts of the interspaces between the separation discs and with said particle outlet, said first flow space communicates with one and said second flow space communicates with the other one of said gas inlet and said gas outlet, the apparatus being formed to conduct substantially all gas, that is supplied through said gas inlet, through the interspaces between the separation discs.

22. A crankcase gas cleaning apparatus according to claim 21, wherein said first flow space communicates with said gas inlet and said second flow space communicates with said gas outlet.

23. A crankcase gas cleaning device according to claim 21, wherein said second flow space communicates with said gas inlet and said first flow space communicates with said gas outlet.

24. Use of an apparatus according to claim 21 for cleaning of crankcase gas from solid or liquid particles suspended therein and having a larger density than the gas, wherein particles separated from the crankcase gas and being in contact with said separation discs are thrown away from the separation discs out into said second flow space delimited by and between the stack of separation discs and the stationary housing.

* * * * *